US011261266B2

(12) United States Patent
Zuideveld

(10) Patent No.: US 11,261,266 B2
(45) Date of Patent: Mar. 1, 2022

(54) PROCESS FOR THE POLYMERIZATION OF A POLYOLEFIN

(71) Applicant: SABIC GLOBAL TECHNOLOGIES B.V., Bergen op Zoom (NL)

(72) Inventor: Martin Alexander Zuideveld, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 19 days.

(21) Appl. No.: 16/494,466

(22) PCT Filed: Mar. 16, 2018

(86) PCT No.: PCT/EP2018/056743
§ 371 (c)(1),
(2) Date: Sep. 16, 2019

(87) PCT Pub. No.: WO2018/167301
PCT Pub. Date: Sep. 20, 2018

(65) Prior Publication Data
US 2020/0087423 A1 Mar. 19, 2020

(30) Foreign Application Priority Data
Mar. 17, 2017 (EP) .................................... 17161663

(51) Int. Cl.
| C08F 2/34 | (2006.01) |
| C08F 4/52 | (2006.01) |
| C08F 4/654 | (2006.01) |
| C08F 10/06 | (2006.01) |
| C08F 2/01 | (2006.01) |

(52) U.S. Cl.
CPC .................. *C08F 2/34* (2013.01); *C08F 4/52* (2013.01); *C08F 4/654* (2013.01); *C08F 10/06* (2013.01); *C08F 2/01* (2013.01)

(58) Field of Classification Search
CPC .... C08F 2/34; C08F 4/52; C08F 4/654; C08F 10/06; C08F 2/01
See application file for complete search history.

(56) References Cited

U.S. PATENT DOCUMENTS

| 4,414,132 | A | 11/1983 | Goodall et al. |
| 4,978,648 | A | 12/1990 | Barbe et al. |
| 5,077,357 | A | 12/1991 | Job |
| 5,106,806 | A | 4/1992 | Job |
| 5,556,820 | A | 9/1996 | Funabashi et al. |
| 8,778,826 | B2 | 7/2014 | Gonzalez et al. |
| 9,663,596 | B2 | 5/2017 | Taftaf et al. |
| 2010/0130709 | A1 | 5/2010 | Chen et al. |
| 2016/0311945 | A1 | 10/2016 | Siddiqui et al. |

FOREIGN PATENT DOCUMENTS

| EP | 1283222 A1 | 2/2003 |
| EP | 1538167 A1 | 6/2005 |
| EP | 1783145 A1 | 5/2007 |
| EP | 2027164 B1 | 8/2012 |
| WO | 9632427 A1 | 10/1996 |

(Continued)

OTHER PUBLICATIONS

Aigner et al., "Optimal Catalyst and Cocatalyst Precontacting in Industrial Ethylene Copolymerization Processes," J. Polym. (2016) pp. 1-10. (Year: 2016).*

(Continued)

*Primary Examiner* — Catherine S Branch
(74) *Attorney, Agent, or Firm* — Cantor Colburn LLP

(57) ABSTRACT

The present invention relates to a process for the polymerization of a polyolefin, preferably polypropylene, in a polymerization reactor by contacting one or more olefins, preferably propylene, with a catalyst system in said reactor while stirring, said catalyst system comprising: * a procatalyst comprising 1) a magnesium-containing support, 2) titanium, 3) a phthalate-free internal electron donor; and 4) optionally an activator; wherein said procatalyst is obtained by the following process: i) contacting a compound $R^4_zMgX^4_{2-z}$, with an alkoxy- or aryloxy-containing silane compound to give a first intermediate reaction product, being a solid $Mg(OR^1)_xX^1_{2-x}$, $R^4$ is the same as $R^1$ being a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms and preferably has between 1 and 20 carbon atoms; wherein $X^4$ and $X^1$ are each independently a halide; z is in a range of larger than 0 and smaller than 2, being $0<z<2$; x is in a range of larger than 0 and smaller than 2, being $0<x<2$; ii) optionally contacting the solid $Mg(OR^1)_xX^1_{2-x}$ obtained in step ii) with at least one activating compound selected from the group formed by activating electron donors and metal alkoxide compounds of formula $M'(OR^2)_{v-w}(OR^3)_w$ or $M^2(OR^2)v_{-w}(R^3)_w$, to obtain a second intermediate product; wherein: $M^1$ is a metal selected from the group consisting of Ti, Zr, Hf, Al or Si; v is the valency of $M^1$; $M^2$ is a metal being Si; v is the valency of $M^2$; $R^2$ and $R^3$ are each independently a hydrocarbyl group; w is smaller than v, v is preferably 3 or 4; iii) contacting the first or second intermediate reaction product, obtained respectively in step i) or ii), with the halogen-containing Ti-compound, the internal electron donor and optionally an activator; * optionally an external electron donor; and * a co-catalyst, being a alkyl aluminum co-catalyst preferably having formula $AlH_nR_{3-n}$, wherein H is a hydride; n is 0, 1 or 2, preferably 0; wherein R is a C1-C12 alkyl group, preferably ethyl; wherein a portion of the co-catalyst and optionally a portion of the external electron donor is (are) pre-contacted with the procatalyst prior to the addition of the catalyst system to the polymerization reactor. The present invention also relates to a polyolefin and a shaped article comprising said polyolefin.

20 Claims, No Drawings

(56) References Cited

FOREIGN PATENT DOCUMENTS

| | | |
|---|---|---|
| WO | 9832427 A1 | 7/1998 |
| WO | 0123441 A1 | 4/2001 |
| WO | 2006056338 A1 | 6/2006 |
| WO | 2014001257 A1 | 1/2014 |
| WO | 2015002298 A1 | 1/2015 |
| WO | 2015091983 A1 | 6/2015 |
| WO | 2015091984 A1 | 6/2015 |
| WO | 2015185489 A1 | 12/2015 |
| WO | 2015185490 A1 | 12/2015 |

OTHER PUBLICATIONS

International Search Report for International Application No. PCT/EP2018/056743, International Filing Date Mar. 16, 2018, dated Sep. 20, 2018, 7 pages.

Pullukat, Thomas J. and Hoff, Raymond E., "Silica-Bases Ziegler-Natta Catalystis: A Patent Review", Catal. Rev.-Sci. Eng. 41(3&4), 1999, pp. 389-438.

Written Opinion for International Application No. PCT/EP2018/056743, International Filing Date Mar. 16, 2018, dated Sep. 20, 2018, 6 pages.

\* cited by examiner

PROCESS FOR THE POLYMERIZATION OF A POLYOLEFIN

CROSS REFERENCE TO RELATED APPLICATIONS

This application is a National Stage application of PCT/EP2018/056743, filed Mar. 16, 2018, which claims the benefit of European Application No. 17161663.4, filed Mar. 17, 2017, both of which are incorporated by reference in their entirety herein.

BACKGROUND

The invention is related to a gas-phase process for the—preferable continuous-polymerization of a polyolefin in a polymerization reactor wherein at least a portion of the co-catalyst and optionally a portion of the external electron donor is (are) pre-contacted with the procatalyst prior to the addition of the catalyst system to the polymerization reactor.

Catalyst systems and their components that are suitable for preparing a polyolefin such as polypropylene are generally known. One type of such catalysts is generally referred to as Ziegler-Natta catalysts. The term "Ziegler-Natta" (ZN) is known in the art and it typically refers to catalyst systems comprising an organometallic compound (also typically referred to as a co-catalyst); optionally one or more electron donor compounds (e.g. external electron donors); and a transition metal-containing solid catalyst compound (also typically referred to as a procatalyst), comprising a transition metal halide (e.g. titanium halide, chromium halide, hafnium halide, zirconium halide, vanadium halide) supported on a metal or metalloid compound (e.g. a magnesium compound or a silica compound). An overview of such catalyst types is for example given by T. Pullukat and R. Hoff in Catal. Rev.—Sci. Eng. 41, vol. 3 and 4, 389-438, 1999. The preparation of such a procatalyst is for example disclosed in WO98/32427 A1.

The present inventors have observed that different types of ZN catalysts lead to polymers having differences in bulk density. It is an aim of the present invention to provide an improved process for polymerizing olefins leading to polyolefins having increased bulk densities. It is an aim of the present invention to provide a polymerization process using a ZN catalyst of the type disclosed in EP 1838741B1—especially phthalate free types of this ZN catalyst—providing polyolefins having an increased bulk density. Without wishing to be bound to a particular theory, the present inventors have observed that with the use of such a ZN catalyst in general lower bulk densities are observed when compared to the use of other ZN-type catalysts.

SUMMARY

The present invention relates to a gas-phase process for the—preferable continuous-polymerization of a polyolefin, preferably polypropylene, in a polymerization reactor by contacting one or more olefins, preferably propylene, with a catalyst system in said reactor while stirring, said catalyst system comprising:
  a procatalyst comprising 1) a magnesium-containing support, 2) titanium, preferably a halogen-containing titanium compound, 3) a phthalate free internal electron donor; and 4) optionally an activator; wherein said procatalyst is obtained by the following process:
  i) contacting a compound $R^4_z MgX^4_{2-z}$ with an alkoxy- or aryloxy-containing silane compound to give a first intermediate reaction product, being a solid $Mg(OR^1)_x X^1_{2-x}$, $R^4$ is the same as $R^1$ being a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms and preferably has between 1 and 20 carbon atoms; wherein $X^4$ and $X^1$ are each independently a halide; z is in a range of larger than 0 and smaller than 2, being $0<z<2$; x is in a range of larger than 0 and smaller than 2, being $0<x<2$;
  ii) optionally contacting the solid $Mg(OR^1)_x X^1_{2-x}$ obtained in step ii) with at least one activating compound selected from the group formed by activating electron donors and metal alkoxide compounds of formula $M^1(OR^2)_{v-w}(OR^3)_w$ or $M^2(OR^2)_{v-w}(R^3)_w$, to obtain a second intermediate product; wherein: $M^1$ is a metal selected from the group consisting of Ti, Zr, Hf, Al or Si; v is the valency of $M^1$; $M^2$ is a metal being Si; v is the valency of $M^2$; $R^2$ and $R^3$ are each independently a hydrocarbyl group; w is smaller than v, v is preferably 3 or 4;
  iii) contacting the first or second intermediate reaction product, obtained respectively in step i) or ii), with the halogen-containing Ti-compound, the internal electron donor and optionally an activator;
    optionally a phthalate free external electron donor; and
    a co-catalyst, being a alkyl aluminum co-catalyst preferably having formula $AlH_n R_{3-n}$, wherein H is a hydride; n is 0, 1 or 2, preferably 0; wherein R is a C1-C12 alkyl group, preferably ethyl;
  wherein a portion of the co-catalyst and optionally a portion of the external electron donor is (are) pre-contacted with the procatalyst prior to the addition of the catalyst system to the polymerization reactor.

The present inventors have observed that with (continuous) gas-phase polymerization processes there can be problems with bulk density, which problems do not arrive (to that extend) in slurry processes. The present inventors have observed that these bulk density issues in gas-phase polymerization may be overcome by the pre-contacting (a portion) of the co-catalyst and optionally an external electron donor, with the procatalyst prior to addition of the catalyst system to the polymerization reactor.

In an embodiment, between 10 to 100%, preferably between 50 and 100% of the total amount of the co-catalyst is pre-contacted with the procatalyst. In an embodiment, at least 20%, or at least 30%, or at least 40%, or at least 50%, or at least 60% or at least 70%, or at least 80%, or at least 90% of the total amount of the co-catalyst is pre-contacted with the procatalyst.

In an embodiment, between 10 to 100%, preferably between 50 and 100% of the total amount of the external electron donor is pre-contacted with the procatalyst. In an embodiment, at least 20%, or at least 30%, or at least 40%, or at least 50%, or at least 60% or at least 70%, or at least 80%, or at least 90% of the total amount of the external electron donor is pre-contacted with the procatalyst.

In an embodiment, between 10 to 100%, preferably between 50 and 100% of the total amount of the co-catalyst and the external electron donor is pre-contacted with the procatalyst. In an embodiment, at least 20%, or at least 30%, or at least 40%, or at least 50%, or at least 60% or at least 70%, or at least 80%, or at least 90% of the total amount of the co-catalyst and external electron donor is pre-contacted with the procatalyst.

The pre-contacting of the procatalyst with the external electron donor is optional. In an embodiment, the external electron donor is selected from the group, consisting of silane-containing donors, preferably selected from the group consisting of alkylamino-alkoxysilanes, alkylamino-aryloxysilanes, alkyl-alkoxysilane, alkyl-aryloxysilane, imidosilanes, and alkylimidosilanes. In the present invention, the internal electron donor is a phthalate free internal donor, preferably the internal electron donor is selected from the group, consisting of monocarboxylic acid esters, aminobenzoates, 1,3-diethers such as 2-isopropyl-2-isobutyl-1,3-dimethoxy propane, silyl esters, and succinates. In an embodiment, the pre-contacted mixture is added to the reactor from a first container—preferably outside of the reactor—which first container is connected to an inlet for the catalyst system which inlet is provided on said polymerization reactor via a connection module. In an embodiment, at least two of said procatalyst, co-catalyst and optionally external electron donor are premixed in a second container and wherein the pre-contacted mixture is added to the first container. In an embodiment, said procatalyst, co-catalyst and optionally external electron donor are pre-contacted in said first container. The present invention relates in another aspect to a polyolefin, preferably polypropylene, obtainable by a process according to the invention. In an embodiment, said polyolefin, preferably polypropylene, has a bulk density of at least 400.

The present invention relates in another aspect to a shaped article prepared from the polyolefin, preferably, polypropylene according to the invention.

Definitions

The following definitions are used in the present description and claims to define the stated subject matter. Other terms not cited below are meant to have the generally accepted meaning in the field.

"Ziegler-Natta catalyst" as used in the present description means: a transition metal-containing solid catalyst compound comprises Ziegler-Natta catalytic species supported on a metal or metalloid compound (e.g. a magnesium compound or a silica compound).

"Ziegler-Natta catalytic species" or "catalytic species" as used in the present description means: a transition metal-containing species comprises a transition metal halide selected from titanium halide, chromium halide, hafnium halide, zirconium halide and vanadium halide.

"internal donor" or "internal electron donor" or "ID" as used in the present description means: an electron-donating compound containing one or more atoms of oxygen (O) and/or nitrogen (N). With a phthalate free internal donor is meant an internal donor that does not comprise a phthalate group, viz. internal donors that are not esters of a benzene-1,2-dicarboxylic acid.

"external donor" or "external electron donor" or "ED" as used in the present description means: an electron-donating compound used as a reactant in the polymerisation of olefins. It comprises at least one functional group that is capable of donating at least one pair of electrons to a metal atom.

"activator" as used in the present description means: an electron-donating compound containing one or more atoms of oxygen (O) and/or nitrogen (N) which is used during the synthesis of the procatalyst prior to or simultaneous with the addition of an internal donor.

"activating compound" as used in the present description means: a compound used to activate the solid support prior to contacting it with the catalytic species.

"modifier" or "Group 13- or transition metal modifier" as used in the present description means: a metal modifier comprising a metal selected from the metals of Group 13 of the IUPAC Periodic Table of elements and transition metals. Where in the description the terms metal modifier or metal-based modifier is used, Group 13- or transition metal modifier is meant.

"procatalyst" and "catalyst component" as used in the present description have the same meaning: a component of a catalyst composition generally comprising a solid support, a transition metal-containing catalytic species and optionally one or more internal donor.

"halide" or "halogen" as used in the present description means: an ion selected from the group of: fluoride (F—), chloride (Cl—), bromide (Br—) or iodide (I—). "Heteroatom" as used in the present description means: an atom other than carbon or hydrogen. However, as used herein—unless specified otherwise, such as below,—when "one or more hetereoatoms" is used one or more of the following is meant: F, Cl, Br, I, N, O, P, B, S or Si. Thus a heteroatom also includes halides.

"hydrocarbyl" as used in the present description means: is a substituent containing hydrogen and carbon atoms, or linear, branched or cyclic saturated or unsaturated aliphatic radical, such as alkyl, alkenyl, alkadienyl and alkynyl; alicyclic radical, such as cycloalkyl, cycloalkadienyl cycloalkenyl; aromatic radical, such as monocyclic or polycyclic aromatic radical, as well as combinations thereof, such as alkaryl and aralkyl.

"substituted hydrocarbyl" as used in the present description means: is a hydrocarbyl group that is substituted with one or more non-hydrocarbyl substituent groups. A non-limiting example of a non-hydrocarbyl substituent is a heteroatom. Examples are alkoxycarbonyl (viz. carboxylate) groups. When in the present description "hydrocarbyl" is used it can also be "substituted hydrocarbyl", unless stated otherwise.

"alkyl" as used in the present description means: an alkyl group being a functional group or side-chain consisting of carbon and hydrogen atoms having only single bonds. An alkyl group may be straight or branched and may be un-substituted or substituted. An alkyl group also encloses aralkyl groups wherein one or more hydrogen atoms of the alkyl group have been replaced by aryl groups.

"aryl" as used in the present description means: an aryl group being a functional group or side-chain derived from an aromatic ring. An aryl group and may be un-substituted or substituted with straight or branched hydrocarbyl groups. An aryl group also encloses alkaryl groups wherein one or more hydrogen atoms on the aromatic ring have been replaced by alkyl groups.

"alkoxide" or "alkoxy" as used in the present description means: a functional group or side-chain obtained from an alkyl alcohol. It consists of an alkyl bonded to a negatively charged oxygen atom.

"aryloxide" or "aryloxy" or "phenoxide" as used in the present description means: a functional group or side-chain obtained from an aryl alcohol. It consists of an aryl bonded to a negatively charged oxygen atom.

"Grignard reagent" or "Grignard compound" as used in the present description means: a compound or a mixture of compounds of formula $R4_zMgX4_{2-z}$ (R4, z, and X4 are as defined below) or it may be a complex having more Mg clusters, e.g. $R4Mg_3Cl_2$.

"polymer" as used in the present description means: a chemical compound comprising repeating structural units, wherein the structural units are monomers.

"olefin" as used in the present description means: an alkene.

"olefin-based polymer" or "polyolefin" as used in the present description means: a polymer of one or more alkenes.

"propylene-based polymer" as used in the present description means: a polymer of propylene and optionally a comonomer.

"polypropylene" as used in the present description means: a polymer of propylene.

"copolymer" as used in the present description means: a polymer prepared from two or more different monomers.

"monomer" as used in the present description means: a chemical compound that can undergo polymerization.

"polymerization conditions" as used in the present description means: temperature and pressure parameters within a polymerization reactor suitable for promoting polymerization between the catalyst composition and an olefin to form the desired polymer. These conditions depend on the type of polymerization used.

"production rate" or "yield" as used in the present description means: the amount of kilograms of polymer produced per gram of procatalyst consumed in the polymerization reactor per hour, unless stated otherwise.

"MFR" or "Melt Flow rate" as used in the present description is measured at a temperature of 230° C. with 2.16 kg load and measured according to ISO 1133:2005.

"bulk density" as used in the present description means: the weight per unit volume of a material, including voids inherent in the material as tested. Bulk density is measured as apparent bulk density according to ASTM D1895-96 Reapproved 2010-e1, test method A.

"pre-contacted" as used in the present description means: to bring into contact (preferably by mixing) the procatalyst with (part of) the co-catalyst and optionally also (part of) the external electron donor. According to the present description when there is cited that the procatalyst is pre-contacted it is meant that at least 10%, preferably at least 30%, preferably at least 50%, or at least 70%, even all of the procatalyst is pre-contacted.

"prepolymerization" as used in the present description means: contacting a mixture of the procatalyst and co-catalyst and optionally the external electron donor with the 1-olefin at temperatures below the actual polymerization temperature.

Unless stated otherwise, when it is stated that any R group is "independently selected from" this means that when several of the same R groups are present in a molecule they may have the same meaning or they may not have the same meaning. For example, for the compound $R_2M$, wherein R is independently selected from ethyl or methyl, both R groups may be ethyl, both R groups may be methyl or one R group may be ethyl and the other R group may be methyl.

The present invention is described below in more detail. All embodiments described with respect to one aspect of the present invention are also applicable to the other aspects of the invention, unless otherwise stated.

DETAILED DESCRIPTION

The present invention relates to a process for the—preferable continuous-polymerization of a polyolefin, preferably polypropylene, in a polymerization reactor by contacting one or more olefins, preferably propylene, with a catalyst system in said reactor while stirring, said catalyst system comprising:

a procatalyst comprising 1) a magnesium-containing support, 2) titanium preferably a halogen-containing titanium compound, 3) a phthalate free internal electron donor; and 4) optionally an activator; wherein said procatalyst is obtained by the following process:

i) contacting a compound $R^4{}_zMgX^4{}_{2-z}$ with an alkoxy- or aryloxy-containing silane compound to give a first intermediate reaction product, being a solid $Mg(OR^1)_xX^1{}_{2-x}$, $R^4$ is the same as $R^1$ being a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms and preferably has between 1 and 20 carbon atoms; wherein $X^4$ and $X^1$ are each independently a halide; z is in a range of larger than 0 and smaller than 2, being $0<z<2$; x is in a range of larger than 0 and smaller than 2, being $0<x<2$;

ii) optionally contacting the solid $Mg(OR^1)_xX^1{}_{2-x}$ obtained in step ii) with at least one activating compound selected from the group formed by activating electron donors and metal alkoxide compounds of formula $M^1(OR^2)_{v-w}(OR^3)_w$ or $M^2(OR^2)_{v-w}(R^3)_w$, to obtain a second intermediate product; wherein: $M^1$ is a metal selected from the group consisting of Ti, Zr, Hf, Al or Si; v is the valency of $M^1$; $M^2$ is a metal being Si; v is the valency of $M^2$; $R^2$ and $R^3$ are each independently a hydrocarbyl group; w is smaller than v, v is preferably 3 or 4;

iii) contacting the first or second intermediate reaction product, obtained respectively in step i) or ii), with the halogen-containing Ti-compound, the internal electron donor and optionally an activator;

optionally a phthalate free external electron donor; and a co-catalyst, being a alkyl aluminum co-catalyst preferably having formula $AlH_nR_{3-n}$, wherein H is a hydride; n is 0, 1 or 2, preferably 0; wherein R is a C1-C12 alkyl group, preferably ethyl;

wherein a portion of the co-catalyst and optionally a portion of the external electron donor is (are) pre-contacted with the procatalyst prior to the addition of the catalyst system to the polymerization reactor.

The inventors surprisingly found that by pre-contacting the catalyst and optionally the donor with the co-catalyst a significantly increased polymer bulk density. The present inventors have observed that the precontacting of the procatalyst (and the external electron donor) with the co-catalyst (or part thereof) in the absence of alpha-olefins leads to increased bulk density when compared to pre-contacting in the presence of a alpha-olefin.

In a standard process the co-catalyst and optionally the external donor (if present) are present in the reactor and the procatalyst is injected into said reactor. The novel process according to the present invention relates to (a part of) the co-catalyst and optionally (a part of) the external electron donor being pre-mixed with the procatalyst and being injected together. The remaining portion(s) (if any) of the co-catalyst and optionally the external electron donor are present in the reactor prior to the addition of the pre-contacted mixture.

Without wishing to be bound to any particular theory, the present inventors believe that the co-catalyst is able to increase the number and size of any cracks that are present on the surface of the procatalyst particles which leads to increasing the accessibility of the procatalyst particle to e.g. the olefin. The inventors have found that the implementation of prepolymerization alone may not sufficiently increase the bulk density.

Details of the Reactor

The process according to the present invention can be carried out in any suitable reactor. The pre-contacting may be carried out in a separate part of the reactor, or may be carried out off-line in a separate reactor or container. In an embodiment, a stirred reactor is used with a catalyst injection system using propylene pressure.

Details of the Procatalyst

The Ziegler-Natta type procatalyst in the catalyst system according to the present invention is obtained by the process that is similar to the process as described in EP2 027 164. Example I including all sub-examples (IA-IE) is incorporated into the present description. More details about the different embodiments are disclosed starting in paragraphs [0016] to [0089]. All these embodiments related to the process and products are incorporated by reference into the present description. In the following part of the description the different steps and phases of the process for preparing the procatalyst according to the present invention will be discussed.

The process for preparing a procatalyst according to the present invention comprises the following phases: phase A): preparing a solid support for the procatalyst; phase B): optionally activating said solid support obtained in phase A using one or more activating compounds to obtain an activated solid support; phase C): contacting said solid support obtained in phase A or said activated solid support in phase B with a catalytic species wherein phase C may comprise one of the following: contacting said solid support obtained in phase A or said activated solid support in phase B with a catalytic species and one or more internal donors to obtain said procatalyst; or contacting said solid support obtained in phase A or said activated solid support in phase B with a catalytic species and one or more internal donors to obtain an intermediate product; or contacting said solid support obtained in phase A or said activated solid support in phase B with a catalytic species and an activator to obtain an intermediate product; and optionally Phase D): modifying said intermediate product obtained in phase C wherein phase D may comprise one of the following: modifying said intermediate product obtained in phase C with a Group 13- or transition metal modifier in case an internal donor was used during phase C, in order to obtain a procatalyst; modifying said intermediate product obtained in phase C with a Group 13- or transition metal modifier and an internal donor in case an activator was used during phase C, in order to obtain a procatalyst.

The procatalyst thus prepared can be used in polymerization of olefins using an external donor and a co-catalyst. The various steps used to prepare the catalyst according to the present invention are described in more detail below. The catalyst according to the present invention thus prepared can be used in polymerization of olefins using an external donor and a co-catalyst.

Phase A: Preparing a Solid Support for the Catalyst.

In the process of the present invention preferably a magnesium-containing support is used. Said magnesium-containing support is known in the art as a typical component of a Ziegler-Natta procatalyst. This step of preparing a solid support for the catalyst is the same as in the prior art process. The following description explains the process of preparing magnesium-based support. Other supports may be used. Synthesis of magnesium-containing supports, such as magnesium halides, magnesium alkyls and magnesium aryls, and also magnesium alkoxy and magnesium aryloxy compounds for polyolefin production, particularly of polypropylenes production are described for instance in U.S. Pat. No. 4,978,648, WO96/32427A1, WO01/23441 A1, EP1283222A1, EP1222214B1; U.S. Pat. Nos. 5,077,357; 5,556,820; 4,414,132; 5,106,806 and 5,077,357 but the present process is not limited to the disclosure in these documents.

Preferably, the process for preparing the solid support for the procatalyst according to the present invention comprises the following steps: step o) which is optional and step i). Step o) preparation of the Grignard reagent (optional) and Step i) reacting a Grignard compound with a silane compound. Optional step o), including many embodiments, is described in detail in WO2015091984 A1 of the same applicant, page 15 line 14 to page 16, line 28, which complete section is incorporated here by reference. Step i), including many embodiments, is described in detail in WO2015091984 A1, page 16 line 30 to page 22, line 25, which complete section is incorporated here by reference.

Phase B: Activating Said Solid Support for the Catalyst.

This step of activating said solid support for the catalyst is an optional step that is not required, but is preferred, in the present invention. If this step of activation is carried out, preferably, the process for activating said solid support comprises the following step ii). This phase may comprise one or more stages. Step ii) relates to the activation of the solid magnesium compound and this step, including many embodiments, is described in detail in WO2015091984 A1 of the same applicant, page 23 line 3 to page 28, line 14, which complete section is incorporated here by reference. According to the present invention, the solid support and procatalyst preferably have an average particle size (or APS) of between 24-30 microns. The particle size is measured using a test method based on ASTM standard test method D4464-201.

Phase C: Contacting Said Solid Support with the Catalytic Species and Either One or More Internal Donors or an Activator.

Phase C: contacting the solid support with a catalytic species. This step can take different forms, such as i) contacting said solid support with the catalytic species and one or more internal donors to obtain said procatalyst; ii) contacting said solid support with a catalytic species and one or more internal donors to obtain an intermediate product; iii) contacting said solid support with a catalytic species and an activator to obtain an intermediate product. This phase C, is described in detail in WO2015091984 A1 of the same applicant, page 28 line 15 to page 31, line 13, which complete section is incorporated here by reference.

Phase C may comprise several stages (e.g. I, II and III). During each of these consecutive stages the solid support is contacted with said catalytic species. In other words, the addition or reaction of said catalytic species may be repeated one or more times. For example, during stage I of phase C said solid support (first intermediate) or the activated solid support (second intermediate) is first contacted with said catalytic species and optionally subsequently with an internal donor. When a second stage is present, during stage II the intermediate product obtained from stage I will be contacted with additional catalytic species which may the same or different than the catalytic species added during the first stage and optionally an internal donor. In case three stages are present, stage III is preferably a repetition of stage II or may comprise the contacting of the product obtained from stage II with both a catalytic species (which may be the same or different as above) and an internal donor. In other words, an internal donor may be added during each of these stages or during two or more of these stages. When an internal donor is added during more than one stage it may be the same or a different internal donor. An internal donor according to Formula A is added during at least one of the stages of Phase C.

An activator according to the present invention—if used—may be added either during stage I or stage II or stage III. An activator may also be added during more than one stage. Preferably, the process of contacting said solid support with the catalytic species and an internal donor comprises the following step iii).

Step iii) Reacting the Solid Support with a Transition Metal Halide

Step iii) reacting the solid support with a transition metal halide (e.g. titanium, chromium, hafnium, zirconium, vanadium) but preferably titanium halide. In the discussion below only the process for a titanium-base Ziegler-Natta procatalyst is disclosed, however, the application is also applicable to other types of Ziegler-Natta procatalysts. Step iii) is described in detail in WO2015091984 A1 page 29 line 28 to page 31, line 13, which complete section is incorporated here by reference. An internal electron donor is added during step iii) according to Formula A. Also mixtures of internal electron donors can be used. Examples of internal electron donors that may be used in addition to the internal electron donor according for Formula A are disclosed below. In an embodiment, only an internal electron donor according to Formula A is used. The molar ratio of the internal electron donor(s) relative to the magnesium may vary between wide limits, for instance from 0.01 to 0.75. Preferably, this molar ratio is from 0.02 to 0.4; more preferably from 0.03 to 0.2. Other optional ranges are between 0.04 to 0.08; between 0.1 and 0.4 or between 0.1 and 0.3.

Optionally an activator is present during step iii) of Phase C instead of an internal donor, this is explained in more detail below in the section of activators. The molar ratio of the activator relative to the magnesium may vary between wide limits, for instance from 0.02 to 1.0. Preferably, this molar ratio is from 0.05 to 0.8; more preferably from 0.1 to 0.6; and most preferably from 0.1 to 0.5.

Phase D: Modifying Said Intermediate Product with a Metal-Based Modifier.

This phase D is optional in the present invention. In a preferred process for modifying the supported catalyst, this phase consists of the following steps: Step iv) modifying the third intermediate product with a metal-modifier to yield a modified intermediate product; Step v) contacting said modified intermediate product with a titanium halide and optionally on or more internal donors to obtain the present procatalyst. The order of addition, viz. the order of first step iv) and subsequently step v) is considered to be very important to the formation of the correct clusters of Group 13- or transition metal and titanium forming the modified and more active catalytic center. Each of these steps is disclosed in more detail below. It should be noted that the steps iii), iv) and v) (viz. phases C and D) are preferably carried out in the same reactor, viz. in the same reaction mixture, directly following each other. Preferably step iv) is carried out directly after step iii) in the same reactor. Preferably, step v) is carried out directly after step iv) in the same reactor.

Step iv): Group 13—or Transition Metal Modification

This step iv) is described in detail in WO2015091984 A1 of the same applicant, page 32 line 31 to page 35, line 11, which complete section is incorporated here by reference.

Step v): Additional Treatment of Intermediate Product.

This step iv) is described in detail in WO2015091984 A1 of the same applicant, page 35 line 14 to page 37, line 14, which complete section is incorporated here by reference.

More information regarding e.g. the ratios of reaction products, weight ratio of certain components in the solid procatalyst and details regarding the procatalyst and its components are as described in WO2015091984 A1 of the same applicant (page 40 line 25 to page 41 line 23), which complete section is incorporated here by reference.

In an embodiment the procatalyst is prepared using a method comprises the steps of:

i) contacting a compound $R^4_z MgX^4_{2-z}$ with an alkoxy- or aryloxy-containing silane compound to give a first intermediate reaction product, being a solid $Mg(OR^1)_x X^1_{2-x}$, wherein: $R^4$ and $R^1$ are each a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms and preferably has from 1 to 20 carbon atoms; preferably $R^4$ is phenyl or butyl; $X^4$ and $X^1$ are each independently selected from the group consisting of fluoride ($F^-$), chloride ($Cl^-$), bromide ($Br^-$) or iodide ($I^-$), preferably chloride; z is in a range of larger than 0 and smaller than 2, e.g. z=1, being 0<z<2; x is in a range of larger than 0 and smaller than 2, being 0<x<2, e.g. x=1;

ii) optionally contacting the first intermediate reaction product obtained in step ii) with at least one activating compound selected from the group formed by activating electron donors and metal alkoxide compounds of formula $M^1(OR^2)_{v-w}(OR^3)_w$ or $M^2(OR^2)_{v-w}(R^3)_w$, to obtain a second intermediate product; wherein: $M^1$ is a metal selected from the group consisting of Ti, Zr, Hf, Al or Si; $M^2$ is a metal being Si; v is the valency of $M^1$ or $M^2$ respectively; w is smaller than v; $R^2$ and $R^3$ are each a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms, and preferably has from 1 to 20 carbon atoms; for example v being either 3 or 4; and iii) contacting the first or second intermediate reaction product, obtained respectively in step i) or ii), with a halogen-containing Ti-compound, optionally an activator, and an internal electron donor.

In other words, a process which comprises the steps of: i) contacting a compound $R^4_z MgX^4_{2-z}$ wherein $R^4$ is aromatic, aliphatic or cyclo-aliphatic group containing 1 to 20 carbon atoms, preferably butyl or phenyl, $X^4$ is a halide, and z is in a range of larger than 0 and smaller than 2, preferably 1; with an alkoxy- or aryloxy-containing silane, preferably tetraalkoxy silane (e.g. tetraethoxy silane) to give a first intermediate reaction product; ii) contacting the solid $Mg(OR^1)_x X_{2-x}$ with at least one, preferably two, activating compound selected from the group formed by electron donors and compounds of formula $M^1(OR^2)_{v-w}(OR^3)_w$, wherein M is Ti, Zr, Hf, Al or Si and $M^2(OR^2)_{v-w}(R^3)_w$, wherein $M^2$ is Si, each $R^2$ and $R^3$, independently, represent an alkyl, alkenyl or aryl group, v is the valency of M (either $M^1$ or $M^2$), v being either 3 or 4 and w is smaller than v; and iii) contacting the second intermediate reaction product with a halogen-containing Ti-compound, an internal electron donor represented by formula A, wherein the R group is either a hydrogen atom (H) or a methyl group (—CH$_3$); N is a nitrogen atom; and O is an oxygen atom; preferably wherein the first intermediate reaction product is contacted with an alcohol (e.g. ethanol) and a titanium tetraalkoxide (e.g. titanium tetraethoxide) in step ii).

In an embodiment, said alkoxy- or aryloxy-containing silane being $Si(OR^5)_{4-n}(R^6)_n$ wherein: $R^5$ and $R^6$ are each independently selected from linear, branched or cyclic hydrocarbyl group independently selected from alkyl, alkenyl, aryl, aralkyl, alkoxycarbonyl or alkylaryl groups (preferably alkyl groups), and one or more combinations thereof; wherein said hydrocarbyl group may be substituted or unsubstituted, may contain one or more heteroatoms and preferably has from 1 to 20 carbon atoms; more preferably C1 to C4 alkyl; and n is in range of 0 to 4, preferably n is from 0 up to and including 1. In a more preferred embodiment said alkoxy- or aryloxy-containing silane being $Si(OR^5)_4$ wherein $R^5$ is C1 to C4 alkyl, most preferably all $R^5$ are ethyl, being tetraethoxy silane (TES).

In a further embodiment, an activator is used, preferably in step iii). In a further embodiment, said activator is selected from the group consisting of benzamides, alkylbenzoates, and mono-esters. In a further embodiment, said activator is selected from the group consisting of ethyl acetate, amyl acetate, butyl acetate, ethyl acrylate, methyl methacrylate, and isobutyl methacrylate, benzamide, methylbenzamide, dimethylbenzamide, methylbenzoate, ethylbenzoate, n-propylbenzoate, iso-propylbenzoate, n-butylbenzoate, 2-butylbenzoate, and t-butylbenzoate. In a preferred embodiment, ethyl acetate or ethyl benzoate is used as activator.

In another aspect a butyl Grignard (preferably BuMgCl or n-BuMgCl) is used to prepare the procatalyst composition. In another aspect a phenyl Grignard (preferably PhMgCl) is used to prepare the procatalyst composition.

In an embodiment, the procatalyst has been modified by using a group 13- or transition metal modifier. This embodiment is applicable to all specific embodiments discussed above. In an embodiment, $TiCl_4$ is used in step iii) as the catalytic species. This embodiment is applicable to all specific embodiments discussed above.

In a further embodiment, during step ii) as activating compounds an alcohol is used as activating electron donor and titanium tetraalkoxide is used as metal alkoxide compound. More preferably a combination of ethanol and titanium tetraethoxide (TET).

This embodiment is applicable to all specific embodiments discussed above.

The procatalyst may have a titanium content of from about 0.1 wt. % to about 6.0 wt. %, based on the total solids weight, or from about 1.0 wt. % to about 4.5 wt. %, or from about 1.5 wt. % to about 3.5 wt. %. The weight ratio of titanium to magnesium in the solid procatalyst composition may be between about 1:3 and about 1:160, or between about 1:4 and about 1:50, or between about 1:6 and 1:30. Weight percent is based on the total weight of the procatalyst composition.

Detailed Description of Internal Donor

In an embodiment, the internal electron donor is a phthalate free internal donor, is selected from the group, consisting of monocarboxylic acid esters, aminobenzoates, 1,3-diethers, silyl esters, and succinates.

The magnesium to internal electron donor molar ratio may be from about 100:1 to about 1:1, or from about 30:1 to about 2:1, or from about 15:1 to about 3:1.

As used herein, an "internal electron donor" or an "internal donor" is a compound added during formation of the procatalyst composition that donates a pair of electrons to one or more metals present in the resultant procatalyst composition. Not bounded by any particular theory, it is believed that the internal electron donor assists in regulating the formation of active sites thereby enhancing catalyst stereoselectivity.

The internal electron donor can be any compound known in the art to be used as internal electron donor. Suitable examples of internal donors include aromatic acid esters, such as monocarboxylic acid ester or dicarboxylic acid esters (e.g. ortho-dicarboxylic acid esters such as phthalic acid esters), aminobenzoates, diethers, silyl esters, succinates and/or combinations thereof.

Monocarboxylic Acid Ester for Use as Internal Donors

As used herein, an "aromatic acid ester" is a monocarboxylic acid ester (also called "benzoic acid ester") as shown in Formula V below

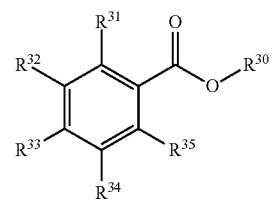

(Formula V)

This internal donor and the R-groups are described in detail in WO201502298 A1 of the same applicant, page 36 line 5 to page 37, line 7, which complete section is incorporated here by reference. This type of internal donor is a phthalate-free donor and hence a preferred donor according to the invention.

Dicarboxylic Acid Esters for Use as Internal Donors

A dicarboxylic acid ester (e.g. an o-dicarboxylic acid also called "phthalic acid ester") as shown in Formula VI or a poly carboxylic acid ester:

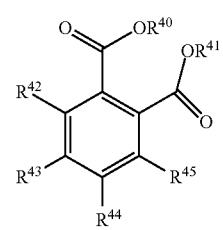

(Formula VI)

This internal donor and the R-groups are described in detail in WO2015091984 A1 of the same applicant, page 4 line 7 to page 5, line 4, and page 44, line 4—page 45, line 10 which complete sections are incorporated here by reference. This type of internal donor is a phthalate donor and hence not a donor according to the invention.

In an embodiment, said internal donor is a substituted 1,2-phenylene aromatic diester compound according to Formula A

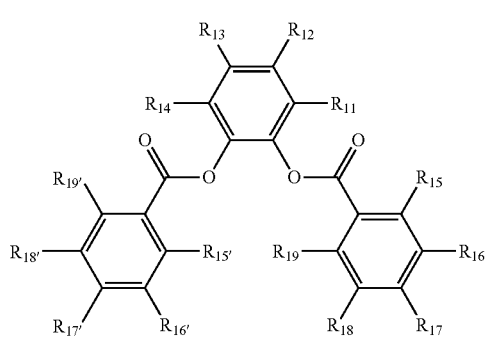

Formula A wherein $R_{11}$, $R_{12}$, $R_{13}$, $R_{14}$, $R_{15}$, $R_{15'}$, $R_{16}$, $R_{16'}$, $R_{17}$, $R_{17'}$, $R_{18}$, $R_{18'}$, $R_{19}$, and $R_{19'}$ are the same or different and wherein each of these R-groups is independently selected from the group consisting of hydrogen, a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof and on the proviso that not all of R-groups may be hydrogen. Preferably, wherein the compound of Formula A is 3-methyl-5-tert-butyl-1,2-phenylene dibenzoate represented by

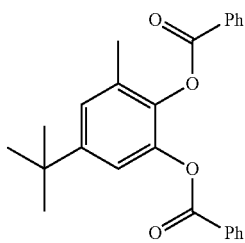 [SMILES: Cc1cc(C(C)(C)C)cc(OC(=O)c2ccccc2)c1OC(=O)c1ccccc1]

This type of internal donor is a phthalate donor and hence not a donor according to the invention.

Aminobenzoates for Use as Internal Donors

The internal donor may also be an aminobenzoate according to formula XI

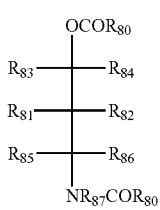

Formula XI

This internal donor and the R-groups are described in detail in WO2015091984 A1 of the same applicant, page 4 line 7 to page 5, line 4, and page 45, line 14 to page 48, line 15 which complete sections are incorporated here by reference. This type of internal donor is a phthalate-free donor and hence a preferred donor according to the invention.

Diethers for Use as Internal Donors

As used herein a "di-ether" may be a 1,3-hydrocarboxy-propane compound, optionally substituted on the 2-position represented by the Formula VII,

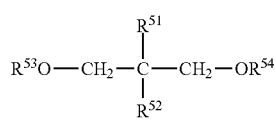

(Formula VII)

This internal donor and the R-groups are described in detail in WO2015022298 A1 of the same applicant, page 38 line 8 to page 40, line 4, which complete section is incorporated here by reference. In a further embodiment of the first aspect, the internal donor is 9,9-bis(methoxymethyl)fluorene. In a further embodiment of the first aspect, the internal donor is 2-isopropyl-2-isobutyl-1,3-dimethoxy propane. This type of internal donor is a phthalate-free donor and hence a preferred donor according to the invention.

Silyl Esters for Use as Internal Donors

The silyl ester as internal donor can be any silyl ester known in the art, for instance as disclosed in U.S. 61/117,820. This type of internal donor is a phthalate-free donor and hence a preferred donor according to the invention.

Succinates for Use as Internal Donors

As used herein a "succinate acid ester" is a 1,2-dicarboxyethane.

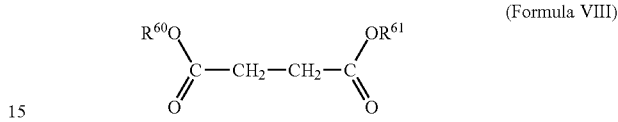

(Formula VIII)

This internal donor and the R-groups are described in detail in WO2015022298 A1 of the same applicant, page 40 line 7 to page 41, line 12, which complete section is incorporated here by reference. This type of internal donor is a phthalate-free donor and hence a preferred donor according to the invention.

Detailed Description of Activator

In an embodiment, an activator is present during this phase C; it may be added during any of the several stages (e.g. I, II and III). iii). The activator may be added during the same or a different stage as the internal electron donor. Several activators can be used, such as benzamide, alkylbenzoates, and monoesters. Each of these will be discussed below.

A benzamide activator has a structure according to Formula X as disclosed in WO2015091983 A1 of the same applicant, page 13, line 13—page 14, line 37, which complete section is incorporated here by reference.

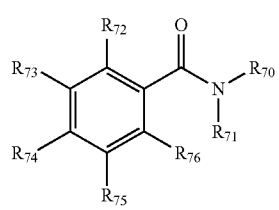

Formula X

Suitable non-limiting examples of "benzamides" include benzamide ($R^{70}$ and $R^{71}$ are both hydrogen and each of $R^{72}$, $R^{73}$, $R^{74}$, $R^{75}$, $R^{76}$ are hydrogen) also denoted as BA-2H or methylbenzamide ($R^{70}$ is hydrogen; $R^{71}$ is methyl and each of $R^{72}$, $R^{73}$, $R^{74}$, $R^{75}$, $R^{76}$ are hydrogen) also denoted as BA-HMe or dimethylbenzamide ($R^{70}$ and $R^{71}$ are methyl and each of $R^{72}$, $R^{73}$, $R^{74}$, $R^{75}$, $R^{76}$ are hydrogen) also denoted as BA-2Me. Without wishing to be bound by a particular theory the present inventors believe that the fact that the most effective activation is obtained when the benzamide activator is added during stage I has the following reason. It is believed that the benzamide activator will bind the catalytic species and is later on substituted by the internal donor when the internal donor is added.

A detailed description of regarding the use of alkylbenzoates as activators is to be found in WO2015091984 A1 of the same applicant, page 42 lines 1-12, which section is incorporated here by reference. More preferably, the activator is ethylbenzoate.

A detailed description of regarding the use of mono-esters as activators is to be found in WO2015091984 A1 of the same applicant, page 42 line 12—page 43, line 24, which section is incorporated here by reference.

In an embodiment, as a procatalyst is used the procatalyst comprising an internal donor according to Formula (I) as disclosed in WO2014/001257 especially the section of page 1, final paragraph to page 2, line 20. This section as well as all other relevant parts related to this procatalyst are incorporated by reference.

In an embodiment, as a procatalyst is used the procatalyst comprising a monoester activator and an internal donor according to Formula (I) as disclosed in WO2014/0118164 especially the section of page 2, line 29 to page 3, line 11. This section as well as all other relevant parts related to this procatalyst are incorporated by reference.

In an embodiment, as a procatalyst is used the procatalyst comprising a monoester activator and an internal donor according to Formula (A) as disclosed in WO2015/185489 especially the section of page 2, line 10 to page 3, line 12. This section as well as all other relevant parts related to this procatalyst are incorporated by reference.

In an embodiment, as a procatalyst is used the procatalyst comprising a benzamide activator according to Formula X and a 1,3-diether internal donor according to Formula VII as disclosed in WO2015/091983 especially the section of page 2, line 23 to page 4, line 7. This section as well as all other relevant parts related to this procatalyst are incorporated by reference.

Detailed Description of Co-Catalyst

The catalyst system according to the present invention includes a co-catalyst. As used herein, a "co-catalyst" is a term well-known in the art in the field of Ziegler-Natta catalysts and is recognized to be a substance capable of converting the procatalyst to an active polymerization catalyst. Generally, the co-catalyst is an aluminum compound. The co-catalyst may include any compounds known in the art to be used as "co-catalysts", as described in WO2015091984 A1 of the same applicant, page 59 line 1 to page 60 line 30, which is incorporated here by reference.

The co-catalyst may include any compounds known in the art to be used as "co-catalysts", such as hydrides, alkyls, or aryls of aluminum and combinations thereof.

The co-catalyst may be a hydrocarbyl aluminum co-catalyst represented by the formula $R^{20}_3Al$, wherein each $R^{20}$ may be independently selected from a hydrogen or a hydrocarbyl, selected from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has between 1 and 20 carbon atoms, more preferably between 1-12 carbon atoms, even more preferably between 1 and 6 carbon atoms. On the proviso that at least one $R^{20}$ is a hydrocarbyl group. Optionally, two or three $R^{20}$ groups are joined in a cyclic radical forming a heterocyclic structure. Examples of $R^{20}$ are methyl, ethyl, propyl, isopropyl, butyl, isobutyl, tert-butyl, pentyl, neopentyl, hexyl, 2-methylpentyl, heptyl, octyl, isooctyl, 2-ethylhexyl, 5,5-dimethylhexyl, nonyl, decyl, isodecyl, undecyl, dodecyl, phenyl, phenethyl, methoxyphenyl, benzyl, tolyl, xylyl, naphthyl, methylnapthyl, cyclohexyl, cycloheptyl, and cyclooctyl.

Suitable examples of hydrocarbyl aluminum compounds as co-catalyst include triisobutylaluminum, trihexylaluminum, di-isobutylaluminum hydride, dihexylaluminum hydride, isobutylaluminum dihydride, hexylaluminum dihydride, diisobutylhexylaluminum, isobutyl dihexylaluminum, trimethylaluminum, triethylaluminum, tripropylaluminum, triisopropylaluminum, tri-n-butylaluminum, trioctylaluminum, tridecylaluminum, tridodecylaluminum, tribenzylaluminum, triphenylaluminum, trinaphthylaluminum, and tritolylaluminum. In an embodiment, the cocatalyst is selected from triethylaluminum, triisobutylaluminum, trihexylaluminum, di-isobutylaluminum hydride and dihexylaluminum hydride.

The co-catalyst can also be a hydrocarbyl aluminum compound represented by the formula $R^{21}_mAlX^{21}_{3-m}$ wherein m, $X^{21}$ and $R^{21}$ are as follows. $R^{21}$ is an alkyl group. Said alkyl group may be linear, branched or cyclic. Said alkyl group may be substituted or unsubstituted. Preferably, said alkyl group has between 1 and 20 carbon atoms, more preferably between 1-12 carbon atoms, even more preferably between 1 and 6 carbon atoms. Non-limiting examples of suitable $R^{21}$ groups are: methyl, ethyl, propyl, isopropyl, butyl, isobutyl, tert-butyl, pentyl, neopentyl, hexyl, 2-methylpentyl, heptyl, octyl, isooctyl, 2-ethylhexyl, 5,5-dimethylhexyl, nonyl, decyl, isodecyl, undecyl, and dodecyl. $X^{21}$ is selected from the group of consisting of fluoride (F—), chloride (Cl—), bromide (Br—) or iodide (I—) or an alkoxide (RO⁻). And m is 1 or 2. Non-limiting examples of suitable alkyl aluminium halide compounds for co-catalyst include tetraethyldialuminoxane, methylaluminoxane, isobutylaluminoxane, tetraisobutyl-dialuminoxane, diethylaluminumethoxide, diisobutylaluminum chloride, methylaluminum dichloride, diethylaluminum chloride, ethylaluminum dichloride and dimethylaluminum chloride. Non-limiting examples of suitable compounds include tetraethyldialuminoxane, methylaluminoxane, isobutylaluminoxane, tetraisobutyldialuminoxane, diethylaluminum ethoxide, diisobutylaluminum chloride, methylaluminum dichloride, diethylaluminum chloride, ethylaluminum dichloride and dimethylaluminum chloride.

Preferably, the co-catalyst is triethylaluminum. The molar ratio of aluminum to titanium may be from about 5:1 to about 500:1 or from about 10:1 to about 200:1 or from about 15:1 to about 150:1 or from about 20:1 to about 100:1. The molar ratio of aluminum to titanium is preferably about 45:1.

Detailed Description of External Donor

One of the functions of an external donor compound is to affect the stereoselectivity of the catalyst system in polymerization of olefins having three or more carbon atoms. Therefore it may be also referred to as a selectivity control agent. Examples of external donors suitable for use in the present invention are the internal donors benzoic acid esters and 1,3-diethers.

In an embodiment, the external electron donor is selected from the group, consisting of silane-containing donors, preferably selected from the group consisting of alkylamino-alkoxysilanes, alkylamino-aryloxysilanes, alkyl-alkoxysilane, alkyl-aryloxysilane, imidosilanes, and alkylimidosilanes.

The aluminum/external donor molar ratio in the polymerization catalyst system preferably is from 0.1 to 200; more preferably from 1 to 100. Mixtures of external donors may be present and may include from about 0.1 mol. % to about 99.9 mol. % of a first external donor and from about 99.9 mol. % to about 0.1 mol. % of either a second or the additional alkoxysilane external donor disclosed below. When a silane external donor is used, the Si/Ti molar ratio in the catalyst system can range from 0.1 to 80, preferably from 0.1 to 60, even more preferably from 1 to 50 and most preferably from 2 to 30.

Documents EP1538167 and EP1783145 disclose a Ziegler-Natta catalyst type comprising an organo-silicon compound as external donor that is represented by formula Si(OR$^c$)$_3$(NR$^d$R$^e$), wherein R$^c$ is a hydrocarbon group having 1 to 6 carbon atoms, R$^d$ is a hydrocarbon group having 1 to 12 carbon atoms or hydrogen atom, and R$^e$ is a hydrocarbon group having 1 to 12 carbon atoms used as an external electron donor. Examples of suitable external donors according to the present invention are known from WO2015091984 A1, being compounds according to Formula III, alkyl-alkoxysilanes according to Formula IV, organosilicon compounds having formula Si(OR$^a$)$_{4-n}$R$^b_n$, imidosilanes according to Formula I, alkylimidosilanes according to Formula I' as described on page 61 line 26 to page 67 line 8 which is incorporated here by reference. Alkoxy silane halide are used for preparing imidosilane and alkylimidosilane internal donors and are, respectively, according to Formula XXIVa: Z$_n$Si(OR$^{11}$)$_{4-n}$ and Formula XXIVa: Z$_n$Si(OR$^{11}$)$_{4-n-m}$(R$^{12}$)$_m$. In the alkoxy silane halide represented by Formula XXIVa and XXIVb, Z is halogen group, and more preferably a chlorine group; n=1, 2 or 3. Specific examples regarding the external donor, considering Formula I' in WO2015091984 A1, are described in WO2015091984 A1 of the same applicant, page 67 lines 9-22, which is incorporated here by reference.

Specific examples of suitable external donors according to the invention may be one or more alkoxysilanes, as described in WO2015091984 A1 of the same applicant, page 67 line 24 to page 69 line 4, which section is incorporated here by reference. In an embodiment, the silane-compound for the external donor is dicyclopentyl dimethoxysilane, di-isopropyl dimethoxysilane (DiPDMS), di-isobutyl dimethyoxysilane, methylcyclohexyl dimethoxysilane, n-propyl trimethoxysilane, n-propyltriethoxysilane, dimethylamino triethoxysilane, and one or more combinations thereof. Preferably, the external donor is an alkyl-alkoxysilane according to formula IV (preferably n-propyl trimethoxysilane or n-propyl triethoxysilane) or cyclohexylmethyldimethoxysilane or another dialkyldialkoxysilane.

The aluminum/external electron donor molar ratio in the polymerization catalyst system preferably is between 0.1 and 200; more preferably between 1 and 100. The external donor of the present invention may include from about 0.1 mol % to about 99.9% mol % of the silane represented by Formula I and from about 99.9 mol % to about 0.1 mol % of the additional alkoxysilane. The Si/Ti molar ratio in the catalyst system can range from 0.1 to 40, preferably from 0.1 to 20, even more preferably from 1 to 20 and most preferably from 2 to 10.

The invention also relates to the preparation of a polymerization catalyst system that comprises the procatalyst according to the invention and a co-catalyst. Preferably, the catalyst system also comprises an external electron-donating compound, also referred to as external electron donor, or simply external donor. The invention also relates to a process to make the catalyst system by contacting the several components.

Details of Pre-Contacting and Dosing of Components to the Reactor

The invention further relates to a process for making a polyolefin by contacting an olefin with the catalyst system according to the present invention. The procatalyst and (part of) the co-catalyst and optionally (part of) the external electron donor are pre-contacted prior to the resulting pre-contacted mixture being added to the polymerization reactor.

In an embodiment, between 10 to 100%, preferably between 50 and 100%, of the total amount of the co-catalyst is pre-contacted with the procatalyst. The effect of pre-contacting at least part of the co-catalyst is that a polyolefin is obtained having an increased bulk density.

In an embodiment, the pre-contacting is carried out in the presence of a solvent, preferably an inert solvent, such as an alkane solvent. In an embodiment, the solvent is heptane. Other suitable solvents are single or pure solvents or mixtures of solvents chosen from the group of butanes, pentanes, hexanes, octanes and higher alkanes. Other suitable solvents may be mineral oils and low molecular weight polyolefins and waxes also as mixtures with alkane solvents.

In case that all of the procatalyst and all of the co-catalyst are pre-contacted, the ratio of aluminum (from the co-catalyst) over titanium (from the procatalyst) during the pre-contacting is thus the same as cited above for during polymerization. In case that less than 100% of either the procatalyst and/or the co-catalyst is used, a different ratio may be present during the pre-contacting in order to arrive at the ratio cited above for during polymerization.

In case that all of the procatalyst and all of the external electron donor are pre-contacted, the ratio of silicon (from the external electron donor) over titanium (from the procatalyst) during the pre-contacting is thus the same as cited above for during polymerization. In case that less than 100% of either the procatalyst and/or the external electron donor is used, a different ratio may be present during the pre-contacting in order to arrive at the ratio cited above for during polymerization.

In an embodiment, the pre-contacting is carried out for a period of at least 10 seconds. In an embodiment, the pre-contacting is carried out for a period of at least 20 seconds. In an embodiment, the pre-contacting is carried out for a period of at least 30 seconds. In an embodiment, the pre-contacting is carried out for a period of at least 45 seconds. In an embodiment, the pre-contacting is carried out for a period of at least 1 minute. In an embodiment, the pre-contacting is carried out for a period of at least 2 or 3 or 4 or 5 or 6 or 7 or 8 or 9 minutes. In an embodiment, the pre-contacting is carried out for a period of at least 10 minutes. In an embodiment, the pre-contacting is carried out for a period of at least 15 minutes. In an embodiment, the pre-contacting is carried out for a period of at least 20 minutes or 25 or 30 minutes. The pre-contacting may last for one to several hours. The optimal time for pre-contacting depends on the concentrations of the components of the pre-contacted mixture.

In an embodiment, the pre-contacted mixture is added to the reactor from a first container—preferably outside of the reactor—which first container is connected to an inlet for the catalyst system which inlet is provided on said polymerization reactor via a connection module.

In an embodiment, at least two of said procatalyst, co-catalyst and optionally external electron donor are premixed in a second container and wherein the pre-contacted mixture is added to the first container. In this embodiment a part or all of the procatalyst to be pre-contacted is added to said second container in addition to a part or all of the co-catalyst to be pre-contacted and optionally in addition to a part or all of the external electron donor to be pre-contacted. In this embodiment, preferably all of the components to be pre-contacted (all of the procatalyst, all of the co-catalyst and optionally all of the external electron donor) is added to this second container. As a non-limiting example can be mentioned, when 10% of the co-catalyst is pre-contacted with 100% of the procatalyst, these amounts may be added to the second container and mixed therein and subsequently, they may be transferred to the first container. It is also possible that 10% of the co-catalyst is pre-contacted with 50% of the procatalyst in the second container which is subsequently contacted with an additional 50% of the procatalyst in the first container.

In an embodiment, said procatalyst, co-catalyst and optionally external electron donor are pre-contacted in said first container. In this embodiment all of the procatalyst to be pre-contacted is added to said container in addition to all of the co-catalyst to be pre-contacted and optionally in addition to all of the external electron donor to be pre-contacted. It should be noted that with "all of the procatalyst/co-catalyst/external electron donor to be pre-contacted" is meant a part or all of the procatalyst/co-catalyst/external electron donor that is added in total to the reactor. The ranges for these portions are cited above.

Contacting the olefin with the catalyst system according to the present invention can be done under standard polymerization conditions, known to the skilled person in the art.

The present catalyst system is suitable for use in a continuous gas-phase polymerization processes in a horizontal stirred bed reactor, or in a liquid pool or fluidized bed.

The olefin according to the invention may be selected from mono- and diolefins containing from 2 to 20 carbon atoms. Suitable olefin monomers include alpha-olefins, such as ethylene, propylene, C4-C20 alpha-olefins, such as 1-butene, 1-pentene, 1-hexene, 4-methyl-1-pentene, 1-heptene, 1-octene, 1-decene, 1-dodecene and the like; C4-C20 diolefins, such as 1,3-butadiene, 1,3-pentadiene, norbornadiene, 5-vinyl-2-norbornene (VNB), 1,4-hexadiene, 5-ethylidene-2-norbornene (ENB) and dicyclopentadiene; C8-C40 vinyl aromatic compounds including styrene, o-, m- and p-methylstyrene, divinylbenzene, vinylbiphenyl, vinylnapthalene; and halogen-substituted C8-C40 vinyl aromatic compounds such as chlorostyrene and fluorostyrene.

Preferably, the olefin is propylene or a mixture of propylene and ethylene, to result in a propylene-based polymer, such as propylene homopolymer or propylene-olefin copolymer. The olefin may an alpha-olefin having up to 10 carbon atoms, such as ethylene, butane, hexane, heptane, octene. A propylene copolymer is herein meant to include both so-called random copolymers which typically have relatively low comonomer content, e.g. up to 10 mol %, as well as so-called impact PP copolymers or heterophasic PP copolymers comprising higher comonomer contents, e.g. from 5 to 80 mol %, more typically from 10 to 60 mol %. The impact PP copolymers are actually blends of different propylene polymers; such copolymers can be made in one or two reactors and can be blends of a first component of low comonomer content and high crystallinity, and a second component of high comonomer content having low crystallinity or even rubbery properties. Such random and impact copolymers are well-known to the skilled in the art. A propylene-ethylene random copolymer may be produced in one reactor. Impact PP copolymers may be produced in two reactors: polypropylene homopolymer may be produced in a first reactor; the content of the first reactor is subsequently transferred to a second reactor into which ethylene (and optionally propylene) is introduced. This results in production of a propylene-ethylene copolymer (i.e. an impact copolymer) in the second reactor.

The present invention relates in another aspect to a polyolefin, preferably polypropylene, obtainable by a process according to the invention. In an embodiment, said polyolefin, preferably polypropylene, has a bulk density of at least 400.

The present invention also relates to a polyolefin, preferably a polypropylene obtained or obtainable by a process, comprising contacting an olefin, preferably propylene or a mixture of propylene and ethylene with the procatalyst according to the present invention. The terms polypropylene and propylene-based polymer are used herein interchangeable. The polypropylene may be a propylene homopolymer or a mixture of propylene and ethylene, such as a propylene-based copolymer, e.g. heterophasic propylene-olefin copolymer; random propylene-olefin copolymer, preferably the olefin in the propylene-based copolymers being ethylene. Such propylene-based (co)polymers are known to the skilled person in the art; they are also described herein above.

The propylene-based polymer may be a propylene homopolymer or a mixture of propylene and ethylene. Such propylene-based polymers are known to the skilled person in the art; they are also described herein above.

The propylene-based polymer obtained according to the present invention can have a melt flow rate (MFR) from about 0.01 g/10 min to about 2000 g/10 min, or from about 0.01 g/10 min to about 1000 g/10 min; or from about 0.1 g/10 min to about 500 g/10 min, or from about 0.5 g/10 min to about 150 g/10 min, or from about 1 g/10 min to about 100 g/10 min.

The propylene-based polymer may be obtained at production rate from about 1 kg/g/hr to about 100 kg/g/hr, or from about 10 kg/g/hr to about 40 kg/g/hr.

The polyolefin, preferably the propylene-based polymer according to the present invention may further comprise additives, such as nucleating agents, clarifiers, stabilizers, release agents, pigments, dyes, plasticizers, anti-oxidants, antistatics, scratch resistance agents, high performance fillers, impact modifiers, flame retardants, blowing agents, recycling additives, coupling agents, anti microbials, anti-fogging additives, slip additives, anti-blocking additives, polymer processing aids such as lubricants and the like, etc., surface tension modifiers, co-agents, for example 1, 4-butanediol dimethacrylate, acrylate or methacrylate; components that enhance interfacial bonding between the polymer and the talc, for example maleated polypropylene etc. Such additives are well known in the art. The skilled person can readily select any suitable combination of additives and additive amounts without undue experimentation. The amount of additives depends on their type and function. Typically, their amounts will be from 0 to 30 wt %, for example from 0 to 20 wt %, for example from 0 to 10 wt % or from 0 to 5 wt % based on the total composition. The sum of all components added in a process to form the polyolefins, preferably the propylene-base polymers or compositions thereof should add up to 100 wt %.

The invention also relates to the use of the polyolefins, preferably the propylene-based polymers according to the invention in injection moulding, blow moulding, extrusion moulding, compression moulding, thin-walled injection moulding, etc, for example in food contact applications.

The present invention relates in another aspect to a shaped article prepared from the polyolefin, preferably, polypropylene according to the invention.

Furthermore, the invention relates to a shaped article comprising the polyolefin, preferably the propylene-based polymer according to the present invention.

The polyolefin, preferably the propylene-based polymer according to the present invention may be transformed into shaped (semi)-finished articles using a variety of processing techniques. Examples of suitable processing techniques include injection moulding, injection compression moulding, thin wall injection moulding, extrusion, and extrusion compression moulding. Injection moulding is widely used to produce articles such as for example caps and closures, batteries, pails, containers, automotive exterior parts like bumpers, automotive interior parts like instrument panels, or automotive parts under the bonnet. Extrusion is for example widely used to produce articles, such as rods, sheets, films and pipes. Thin wall injection moulding may for example be used to make thin wall packaging.

It is noted that the invention relates to all possible combinations of features recited in the claims. Features described in the description may further be combined.

It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps.

The invention will be further elucidated with the following examples without being limited hereto.

EXAMPLES

Synthesis of 1,3-diether Procatalyst A

The procatalyst A with an 1,3-diether internal electron donor were synthesized according to the following general procedures:

To a 500 mL reactor with a mechanical stirrer, $TiCl_4$ (125 mL) was added under $N_2$ outflow and heated to 100° C. while stirring at 400±20 rpm. The support (5.5 g) in heptane (total volume=15 mL) was added to the reactor while stirring after which the reactor temperature was raised to 110° C. over a period of 10 minutes. After that, a mixture of the internal electron donor 2-isopropyl-2-isobutyl-1,3-dimethoxy propane (ID/Mg=0.10 mol/mol, 3.80 mmol) and N,N-dimethyl benzamide (5.71 mmol, BA/Mg=0.15 mol/mol) in chlorobenzene (2-3 mL) was added to the reactor. The reactor temperature was raised to 115° C. over a period of 15 minutes. The mixture was stirred at 115° C. for 105 minutes. The reaction mixture was allowed to settle and the supernatant fluid was decanted. The solid was washed with preheated (90-100° C.) chlorobenzene (125 mL) at 100° C. for 15 minutes. The reaction mixture was allowed to settle and the supernatant fluid was decanted. A mixture of preheated TiCl4 (62.5 mL) and preheated chlorobenzene (62.5 mL), both preheated to 90-100° C.) was added and the mixture was stirred for 30 minutes at 115° C. The reaction mixture was allowed to settle and the supernatant fluid was decanted. The treatment with TiCl4/chlorobenzene mixture, settling and washing step was repeated three times. The resulting solid was washed with heptane (5×100 mL) at low temperatures (removed heat source completely). The procatalyst was then dried on a glass frit using a flow of nitrogen at ambient conditions before use in polymerization.

Synthesis of 1,3-diether Procatalyst B

The synthesis of procatalyst A was repeated with the following exceptions. A first difference being that the reaction with TiCl4 in each step was carried out at 105° C. instead of 115° C. A second difference being that 9,9-bis(methoxymethyl)fluorene is used as the internal electron donor (ID/Mg=0.10 mol/mol).

Synthesis of Aminobenzoate Procatalyst C

Procatalyst C is a procatalyst with an aminobenzoate internal electron donor, 4-[benzoyl(methyl)amino]pentan-2-yl benzoate, and was synthesized as described in WO 2015185490 A1.

Synthesis of Carbamate Procatalyst D

Procatalyst D is a procatalyst with a carbamate internal electron donor, 4-((ethoxycarbonyl)oxo) pentan-2-yl) (methyl)carbamate, and was synthesized as described in WO 2015185489 A1.

Synthesis of Phthalate Procatalyst E

Procatalyst E is a procatalyst with a di-n-butyl phthalate internal electron donor, and was synthesized as described in Example 1 of EP 1222214 B1. This is a comparative procatalyst.

Batch Propylene Polymerization Experiments without Pre-Contacting (Comparative)

Propylene polymerization experiments were performed using procatalysts described above. Triethylaluminium (TEAL) was used as co-catalyst, and as external electron donor di-isopropyl-dimethoxy silane (DiPDMS) were employed. The polymerization of propylene was carried out in a stainless steel reactor with a volume of 1800 mL. Under a nitrogen atmosphere, the co-catalyst (TEAL) and the external electron donor were dosed to the reactor as heptane solutions. The molar ratio of co-catalyst to titanium (from the procatalyst) was set to 160, and the Si/Ti ratio was set to 11.3. Subsequently 120-125 gram of propylene was added to the reactor and the temperature was kept at 30 degrees Celsius, i.e. that propylene is in a liquid/gas state. Then 10 mg of procatalyst in 200 microliter mineral oil was injected into the reactor with pressurized propylene immediately after that. After this dosing, the reactor temperature was maintained below 30° C. for 10 minutes. Subsequently, the temperature and pressure were raised to its setpoint (either 60 or 70° C., c.f. Table 1a) by heating and additional dosing of propylene (20 bar gauge). After the pressure setpoint has been reached, the polymerization was continued for 60 minutes. During the polymerization reaction the gas cap composition of propylene and hydrogen was controlled using mass flow meters and online-GC control. After reaching the polymerization time the reactor was depressurized and cooled to ambient conditions. The propylene polymer so obtained was removed from the reactor.

Comparative Example 1 uses procatalyst A. Comparative Example 2 uses procatalyst B. Comparative Examples 3 and 6 use procatalyst C. Comparative Example 4 uses procatalyst D. Comparative Example 5a uses procatalyst E.

Batch Propylene Polymerization Experiments with Pre-Contacting of Co-Catalyst and External Donor (According to Invention)

These experiments were performed in the same way as the experiments without pre-contacting, with the following differences.

The 10 mg of procatalyst was pre-contacted off-line (outside of the reactor in a first container) with co-catalyst (TEAL) and external electron donor (DiPDMS) in 5 mL of heptane under stirring. This pre-contacted mixture was injected into the reactor with pressurized propylene. The molar ratios during pre-contacting were Al/Ti=160 and Si/Ti=11.3 with the pre-contacting time being 15 minutes or 30 minutes (c.f. Table 1a).

Example 1 uses procatalyst A with a pre-contacting time of 30 minutes. Examples 2a and 2b use procatalyst B with a pre-contacting time of 15 minutes. Example 3 uses procatalyst C with a pre-contacting time of 15 minutes. Example 4 uses procatalyst D with a pre-contacting time of 15 minutes. Comparative Examples 5b use procatalyst E with a pre-contacting time of 30 minutes respectively. This is a comparative since it is a phthalate catalyst.

Batch Propylene Polymerization Experiments with Pre-Contacting of Co-Catalyst (According to Invention)

These experiments were performed in the same way as the experiments without pre-contacting, with the following differences.

The 10 mg of procatalyst was pre-contacted off-line (outside of the reactor in a first container) with co-catalyst (TEAL) in 5 mL of heptane under stirring. This pre-contacted mixture was injected into the reactor with pressurized propylene. The molar ratios during pre-contacting were Al/Ti=160 and Si/Ti=11.3 with the pre-contacting time being 15 minutes or 30 minutes (c.f. Table 1a). The external donor was DiPDMS and was not pre-contacted.

Example 1 uses procatalyst A with a pre-contacting time of 30 minutes. Examples 2a and 2b use procatalyst B with a pre-contacting time of 15 minutes. Example 3 uses procatalyst C with a pre-contacting time of 15 minutes. Example 4 uses procatalyst D with a pre-contacting time of 15 minutes. Comparative Examples 5b use procatalyst E with a pre-contacting time of 30 minutes respectively. This is a comparative since it is a phthalate catalyst. Example 6 uses procatalyst C with a pre-contacting time of 30 seconds and Example 7 uses procatalyst C with a pre-contacting time of 2 minutes.

Table 1a below shows an overview of the above experiments; the columns show (from left to right): the experimental number; the procatalyst used; the internal donor used, the external donor used, the pre-contacting time; the temperature set point, and the amount of hydrogen (H2) in volume %

Table 1b shows the results; the columns showing (from left to right): the experimental number; the molar ratio of aluminum (co-catalyst) over titanium (procatalyst); the molar ratio of silicon (external electron donor) over titanium (procatalyst); the polymer yield (kg of polymer per gram of procatalyst); the bulk density (in gram per 100 ml); and the MFR (g/10 min).

From the experimental results the following is observed. Examples 1-4 (comprising a phthalate free internal electron donor) show increased bulk density when compared to the respective comparative examples 1-4, indicating that pre-contacting of the co-catalyst and external donor for systems having a phthalate free internal donor increases the bulk density. This effect is not seen when comparing CE5b with CE5a, having an phthalate internal donor. When comparing examples 6 and 7 to comparative example 6, it is clear that pre-contacting with the co-catalyst alone (without the external donor) has an increasing effect on the bulk density but that extended pre-contacting time leads to a lower yield.

TABLE 1b

Polymerization results

| Exp. No. | Al/Ti mol/mol | Si/Ti mol/mol | Yield Kg PP/g cat | BD g/100 ml | MFR g/10 min |
|---|---|---|---|---|---|
| CE1 | 160 | 11.1 | 15.7 | 41.8 | 13.3 |
| E1 | 160 | 11.1 | 6.3 | 49.4 | 11.1 |
| CE2 | 160 | 4.0 | 26.5 | 40.6 | 19.4 |
| E2a | 160 | 4.0 | 14.2 | 46.2 | 20.1 |
| E2b | 100 | 8.1 | 11.2 | 46.9 | 29.2 |
| CE6 | 160 | 11.3 | 16.1 | 40.2 | 1.95 |
| E6 | 160 | 11.3 | 19.6 | 46.3 | 2.11 |
| E7 | 160 | 11.3 | 10.7 | 46.8 | 3.13 |
| CE3 | 100 | 9.9 | 11.9 | 37.9 | 3.0 |
| E3 | 100 | 9.9 | 9.0 | 48.4 | 3.0 |
| CE4 | 100 | 8.0 | 7.8 | 40.9 | 6.3 |
| E4 | 100 | 8.0 | 6.1 | 45.1 | 7.2 |
| CE5a | 100 | 7.9 | 22.1 | 42.6 | 7.5 |
| CE5b | 100 | 7.9 | 11.2 | 42.6 | 8.1 |

The invention claimed is:

1. A gas-phase process for the polymerization of a polyolefin in a polymerization reactor by contacting one or more olefins with a catalyst system in said reactor while stirring, said catalyst system comprising:

a procatalyst comprising 1) a magnesium-containing support, 2) titanium, 3) a phthalate free internal electron donor; and 4) optionally an activator; wherein said procatalyst is obtained by the following process:

i) contacting a compound $R^4_z MgX^4_{2-z}$ with an alkoxy- or aryloxy-containing silane compound to give a first intermediate reaction product, being a solid $Mg(OR^1)_x X^1_{2-x}$, $R^4$ is the same as $R^1$ being a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms; wherein $X^4$ and $X^1$ are each independently a halide; z is in a range of larger than 0 and smaller than 2, being 0<z<2; x is in a range of larger than 0 and smaller than 2, being 0<x<2;

TABLE 1a

Polymerization experiments

| Exp. No. | Procat | ID (phthalate?) | Pre-contact Co-cat? | Pre-contact ED? | Time (min) | Temp Set point (° C.) | H2 (vol. %) |
|---|---|---|---|---|---|---|---|
| CE1 | A | 2-isopropyl-2-isobutyl-1,3-dimethoxy propane (no) | No | No | | 70 | 1.0 |
| E1 | A | 2-isopropyl-2-isobutyl-1,3-dimethoxy propane (no) | Yes | Yes | 30 | 70 | 1.0 |
| CE2 | B | 9,9-bis(methoxymethyl)fluorene (no) | | | | 70 | 1.0 |
| E2a | B | 9,9-bis(methoxymethyl)fluorene (no) | Yes | Yes | 15 | 70 | 1.0 |
| E2b | B | 9,9-bis(methoxymethyl)fluorene (no) | Yes | Yes | 15 | 60 | 2.0 |
| CE3 | C | Aminobenzoate (no) | No | No | | 60 | 2.0 |
| E3 | C | Aminobenzoate (no) | Yes | Yes | 15 | 60 | 2.0 |
| CE6 | C | Aminobenzoate (no) | No | No | | 70 | 1.0 |
| E6 | C | Aminobenzoate (no) | Yes | No | 0.5 | 70 | 1.0 |
| E7 | C | Aminobenzoate (no) | Yes | No | 2 | 70 | 1.0 |
| CE4 | D | Carbamate (no) | No | No | | 60 | 2.0 |
| E4 | D | Carbamate (no) | Yes | Yes | 15 | 60 | 2.0 |
| CE5a | E | n-butyl phthalate (yes) | No | No | | 60 | 2.0 |
| CE5b | E | n-butyl phthalate (yes) | Yes | Yes | 30 | 60 | 2.0 | ii) optionally contacting the solid $Mg(OR^1)_xX^1_{2-x}$ obtained in step ii) with at least one activating compound selected from the group formed by activating electron donors and metal alkoxide compounds of formula $M^1(OR^2)_{v-w}(OR^3)_w$ or $M^2(OR^2)_{v-w}(R^3)_w$, to obtain a second intermediate product; wherein: $M^1$ is a metal selected from the group consisting of Ti, Zr, Hf, Al or Si; v is the valency of $M^1$; $M^2$ is a metal being Si; v is the valency of $M^2$; $R^2$ and $R^3$ are each independently a hydrocarbyl group; w is smaller than v;

iii) contacting the first or second intermediate reaction product, obtained respectively in step i) or ii), with a halogen-containing Ti-compound, the internal electron donor and optionally an activator;

an external electron donor which is a phthalate free external electron donor; and a co-catalyst, being a alkyl aluminum co-catalyst;

wherein a portion of the co-catalyst and optionally a portion of the external electron donor are pre-contacted with the procatalyst for greater than zero to less than 2 minutes in the presence of an alkane solvent prior to the addition of the catalyst system to the polymerization reactor.

2. The process according to claim 1, wherein between 10 to 100% of the total amount of the co-catalyst is pre-contacted with the procatalyst.

3. The process according to claim 1, wherein the external electron donor is a silane-containing donor.

4. The process according to claim 1, wherein the pre-contacted mixture is added to the reactor from a first container, which first container is connected to an inlet for the catalyst system which inlet is provided on said polymerization reactor via a connection module.

5. The process according to claim 4, wherein at least two of said procatalyst, co-catalyst and optionally external electron donor are premixed in a second container and wherein the pre-contacted mixture is added to the first container.

6. The process according to claim 4, wherein said procatalyst, co-catalyst and optionally external electron donor are pre-contacted in said first container.

7. The process according to claim 1, wherein said process is for polymerization of polypropylene.

8. The process according to claim 1, wherein said alkyl aluminum co-catalyst has a formula $AlH_nR_{3-n}$, wherein H is a hydride; n is 0, 1 or 2; wherein R is a C1-C12 alkyl group.

9. The process according to claim 8, wherein n is 0.

10. The process according to claim 8, wherein R is ethyl.

11. The process according to claim 1, wherein between 50 and 100% of the total amount of the co-catalyst is pre-contacted with the procatalyst.

12. The process according to claim 1, wherein the external electron donor is selected from alkylamino-alkoxysilanes, alkylamino-aryloxysilanes, alkyl-alkoxysilane, imidosilanes, and alkylimidosilanes.

13. The process according to claim 1, wherein the internal electron donor is selected from monocarboxylic acid esters, aminobenzoates, 1,3-diethers, silyl esters, and succinates.

14. The process according to claim 1, wherein the polyolefin polymerized by the process has an increased bulk density as compared to a comparative polyolefin polymerized by an otherwise identical process except that the co-catalyst and the external electron donor are not pre-contacted with the procatalyst prior to the addition of the catalyst system to the polymerization reactor.

15. The process according to claim 1, wherein the polyolefin polymerized by the process has an increased bulk density as compared to a comparative polyolefin polymerized by an otherwise identical process except that the co-catalyst and the external electron donor are not pre-contacted with the procatalyst prior to the addition of the catalyst system to the polymerization reactor.

16. The process according to claim 1, wherein said process is for producing a polyolefin having a bulk density of at least 400.

17. The process according to claim 1, wherein said process is for producing a polypropylene having a bulk density of at least 400.

18. The process according to claim 4, wherein the first container is situated outside of the reactor.

19. The process according to claim 1, wherein in formula $M_1(OR_2)_{v-w}(OR^3)_w$ or $M^2(OR^2)_{v-w}(R^3)_w$ v is 3 or 4.

20. The process according to claim 1, wherein the internal electron donor is an aminobenzoate.

* * * * *